(12) United States Patent
Messer et al.

(10) Patent No.: US 7,739,411 B2
(45) Date of Patent: Jun. 15, 2010

(54) METHOD AND SYSTEM FOR CONTENT SYNCHRONIZATION AND DETECTING SYNCHRONIZATION RECURSION IN NETWORKS

(75) Inventors: Alan Messer, Los Gatos, CA (US); Mahfuzur Rahman, Santa Clara, CA (US); Wonseok Kwon, Suwon-si (KR); Seung Jae Oh, Seoul (KR); Jian Huang, Santa Clara, CA (US)

(73) Assignee: Samsung Electronics Co., Ltd., Suwon (KR)

(*) Notice: Subject to any disclaimer, the term of this patent is extended or adjusted under 35 U.S.C. 154(b) by 454 days.

(21) Appl. No.: 11/784,464

(22) Filed: Apr. 5, 2007

(65) Prior Publication Data

US 2008/0040511 A1    Feb. 14, 2008

Related U.S. Application Data

(60) Provisional application No. 60/822,076, filed on Aug. 11, 2006.

(51) Int. Cl.
*G06F 15/16* (2006.01)
*G06F 15/173* (2006.01)
*G06F 7/00* (2006.01)
*G06F 17/30* (2006.01)
*G06F 12/00* (2006.01)

(52) U.S. Cl. .................. 709/248; 709/201; 709/217; 709/225; 709/232; 707/2; 707/10; 707/200; 711/141; 711/147; 711/174

(58) Field of Classification Search ............... 709/248, 709/217, 201, 232, 225; 707/2, 10, 200; 711/141, 147, 174
See application file for complete search history.

(56) References Cited

U.S. PATENT DOCUMENTS

| 7,130,925 | B2 | 10/2006 | Noda et al. |
| 7,366,861 | B2 | 4/2008 | Manchester et al. |
| 7,558,847 | B2 | 7/2009 | Strassner |
| 2004/0193609 | A1 | 9/2004 | Phan et al. |
| 2005/0021866 | A1 | 1/2005 | Kang .................. 709/248 |
| 2005/0055352 | A1* | 3/2005 | White et al. .............. 707/10 |
| 2005/0262310 | A1* | 11/2005 | Starbuck .................. 711/141 |
| 2006/0015580 | A1 | 1/2006 | Gabriel et al. |
| 2006/0159109 | A1 | 7/2006 | Lamkin et al. |
| 2006/0168126 | A1 | 7/2006 | Costa-Requena et al. |
| 2007/0088675 | A1* | 4/2007 | Duncan .................. 707/2 |

OTHER PUBLICATIONS

Universal Plug and Play (UpnP), Welcome to the UPnP Forum!, http://www.upnp.org, p. 1-2, Jan. 31, 2008.

(Continued)

*Primary Examiner*—Wing F Chan
*Assistant Examiner*—Benjamin M Thieu
(74) *Attorney, Agent, or Firm*—Kenneth L. Sherman, Esq.; Michael Zarrabian, Esq.; Myers Andras Sherman LLP

(57) ABSTRACT

A method and system implementing a process for content synchronization that detects and prevents synchronization recursion in CDS transfer operations. A synchronization relationship is formed between the CDS containers in multiple devices. Then content synchronization processes are performed based on that relationship to avoid synchronization recursion.

35 Claims, 12 Drawing Sheets

OTHER PUBLICATIONS

Cover Pages: MPEG-21 Part 2: Digital Item Declaration Language (DIDL), http://xml.coverpages.org/mpeg21-didl.html, pp. 1-7, Jan. 31, 2008.

Kirt Debique, et al, ContentDirectory: 1 Service Template Version 1.0, Jun. 25, 2002, http://www.upnp.org/standardizeddcps/documents/ContentDirectory1.0.pdf, pp. 1-89.

European Search Report for Application Serial No. 06250160.0-2415 dated Oct. 6, 2006.

U.S. Final Office Action for U.S. Appl. No. 11/101,964 mailed on Nov. 10, 2009.

U.S. Office Action for U.S. Appl. No. 11/101,964 mailed on Mar. 4, 2009.

U.S. Advisory Action for U.S. Appl. No. 11/101,964 mailed on Dec. 3, 2008.

U.S. Final Office Action for U.S. Appl. No. 11/101,964 mailed on Sep. 24, 2008.

U.S. Office Action for U.S. Appl. No. 11/101,964 mailed on May 12, 2008.

* cited by examiner

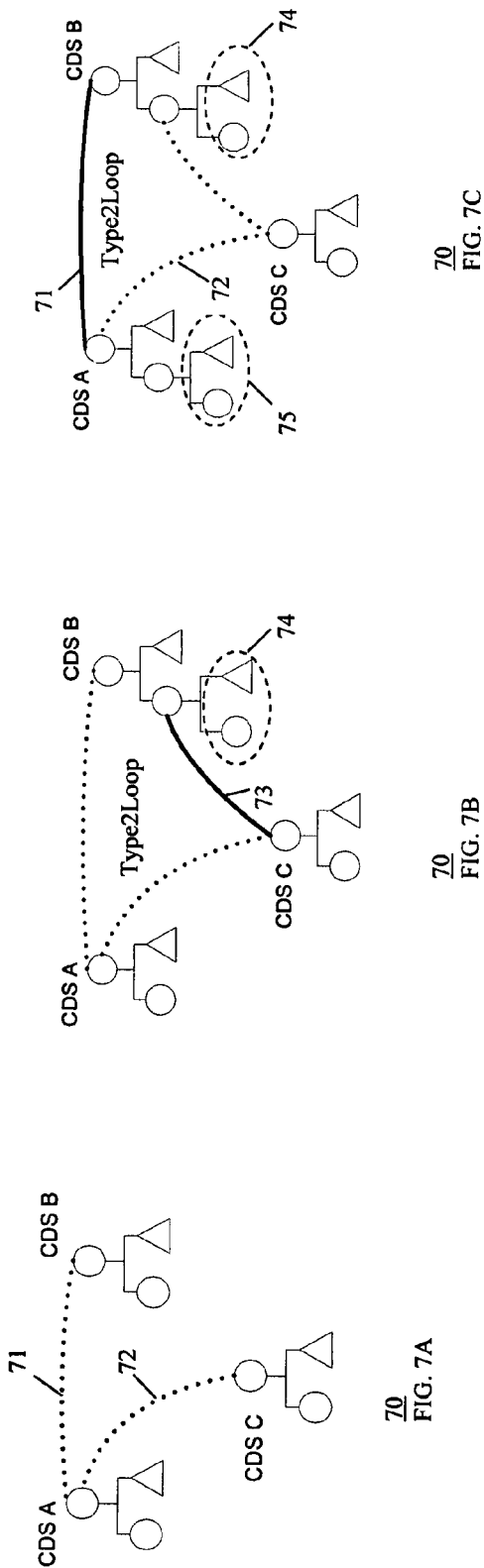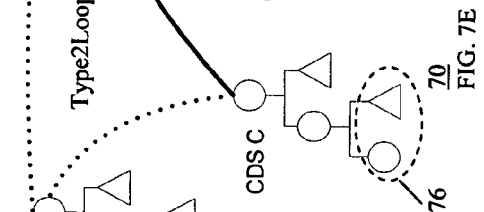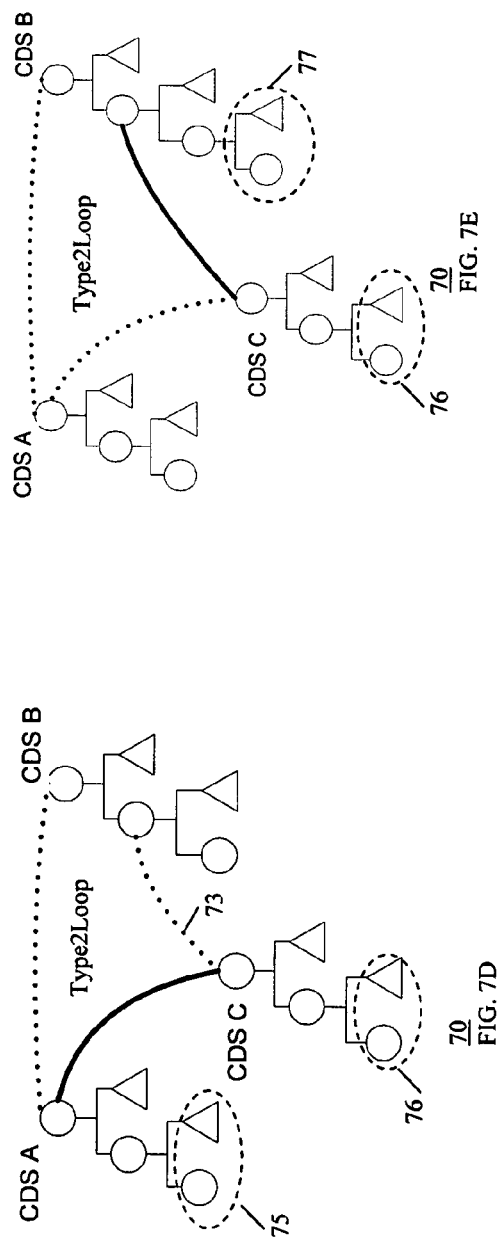

80

80

80

80

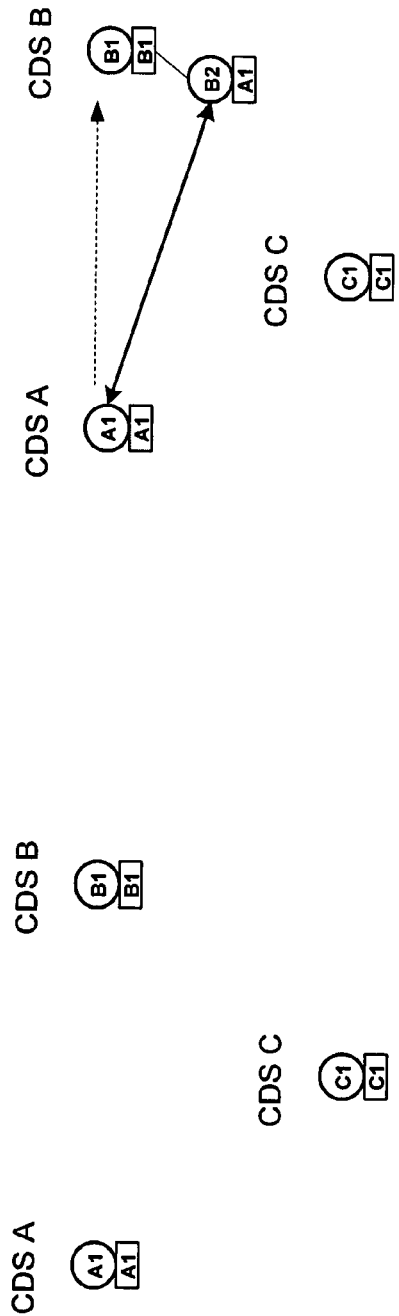
FIG. 11A
FIG. 11B
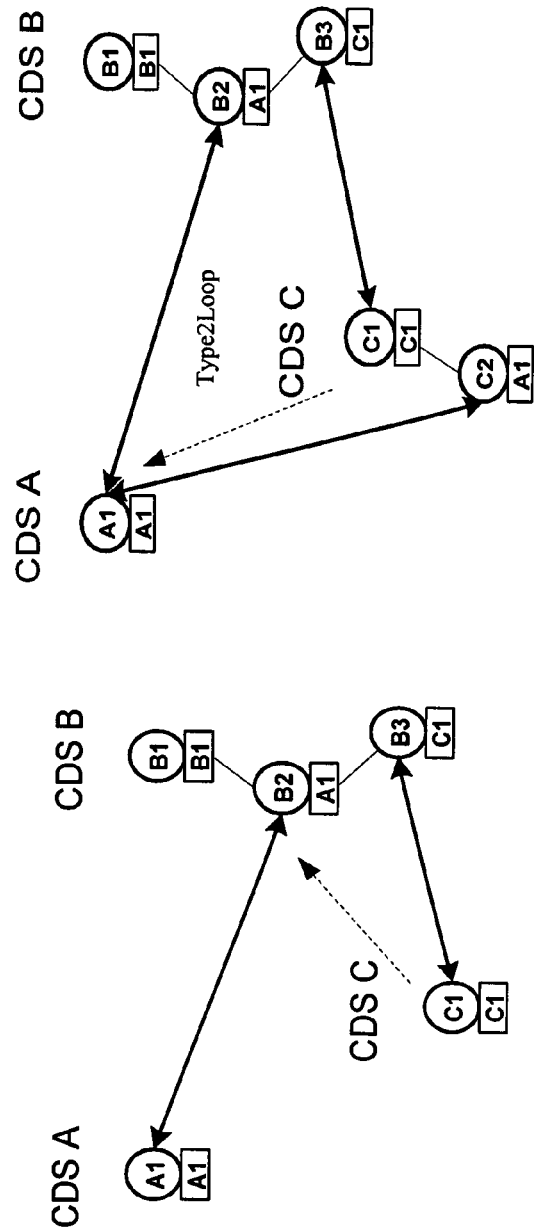
FIG. 11C
FIG. 11D

METHOD AND SYSTEM FOR CONTENT SYNCHRONIZATION AND DETECTING SYNCHRONIZATION RECURSION IN NETWORKS

RELATED APPLICATION

This application claims priority from U.S. Provisional Patent Application Ser. No. 60/822,076 filed Aug. 11, 2006, incorporated herein by reference.

FIELD OF THE INVENTION

The present invention relates to content synchronization and in particular, to detecting synchronization recursion during content synchronization.

BACKGROUND OF THE INVENTION

The Universal Plug and Play (UPnP) architecture provides a Content Directory Service (CDS) for content management in a network that includes multiple devices containing various content. A CDS allows a user to access the content in a device using content browsing features of the CDS, without direct interaction with that device.

A CDS for a device comprises a hierarchical structure including a container that maintains objects containing one or more items, and may include other containers therein in a hierarchical fashion. Each object includes a description having an identifier and optional metadata. The object may further include content or a locator for the content. The user can browse the CDS for objects.

A CDS also supports uploading and downloading of CDS objects. To transfer objects from one CDS to another CDS, the user searches/browses objects for transfer, and uses a CDS to transfer (e.g., import and/or export) those objects.

Such a transfer operation may be acceptable when a transfer occurs one time. However, a series of such operations on a regular basis is tedious, time consuming and prone to mistakes. For example, if a user desires to have the same music content in a mobile device and in a music folder of a media server, the user must browse objects via the CDS and determine which objects to transfer, and then perform the transfer. Further, in order to synchronize the CDS containers in various devices which the user desires to contain the changed content, the user must repeat these operations whenever the music content (object) has changed. The user must further take care to not introduce recursion, which occurs when devices involved in content synchronization copy objects from each other indefinitely. There is, therefore, a need for a method and system for content synchronization in a network, which address the above shortcomings.

BRIEF SUMMARY OF THE INVENTION

The present invention provides a method and system implementing a process for synchronizing content between a network of plural devices. In one embodiment, the process includes providing a CDS in each of multiple devices in the network, wherein each CDS comprises a hierarchical structure of containers for storing data objects, wherein each container includes a globally unique identification.

A synchronization relationship is created between each pair of devices among said two or more devices for synchronizing objects in selected containers, wherein each object includes a globally unique identification, such that a combination of said synchronization relationship with one or more existing synchronization relationships is free of a recursive synchronization loop.

The present invention provides a process for content synchronization that detects and prevents synchronization recursion in CDS transfer operations. A synchronization relationship is formed between the CDS containers in multiple devices, wherein content synchronization processes (uploading/downloading) are performed based on that relationship to detect and thereby prevent synchronization recursion.

These and other features, aspects and advantages of the present invention will become understood with reference to the following description, appended claims and accompanying figures.

BRIEF DESCRIPTION OF THE DRAWINGS

FIGS. 7A-E show an example of synchronization recursion due to a synchronization loop.

FIGS. 11A-D show an example of a loop that may not be detectable during a synchronization relationship creation.

DETAILED DESCRIPTION OF THE INVENTION

The present invention provides a method and system for content synchronization, including the detection of synchronization recursion, in CDS transfer operations. In one embodiment this involves a content synchronization process which enables content synchronization between the CDSs in devices in a network, which detects and thereby prevents synchronization loops that lead to synchronization recursion.

The content synchronization operation is initiated by a control point and occurs between the CDSs in two or more controlled devices. Generally, a control point comprises a device that is capable of controlling one or more controlled devices which provide services in a network. As control points and controlled devices are logical entities, a physical device can host one or more control points and/or one or more controlled devices that provide several services.

Figure 1:
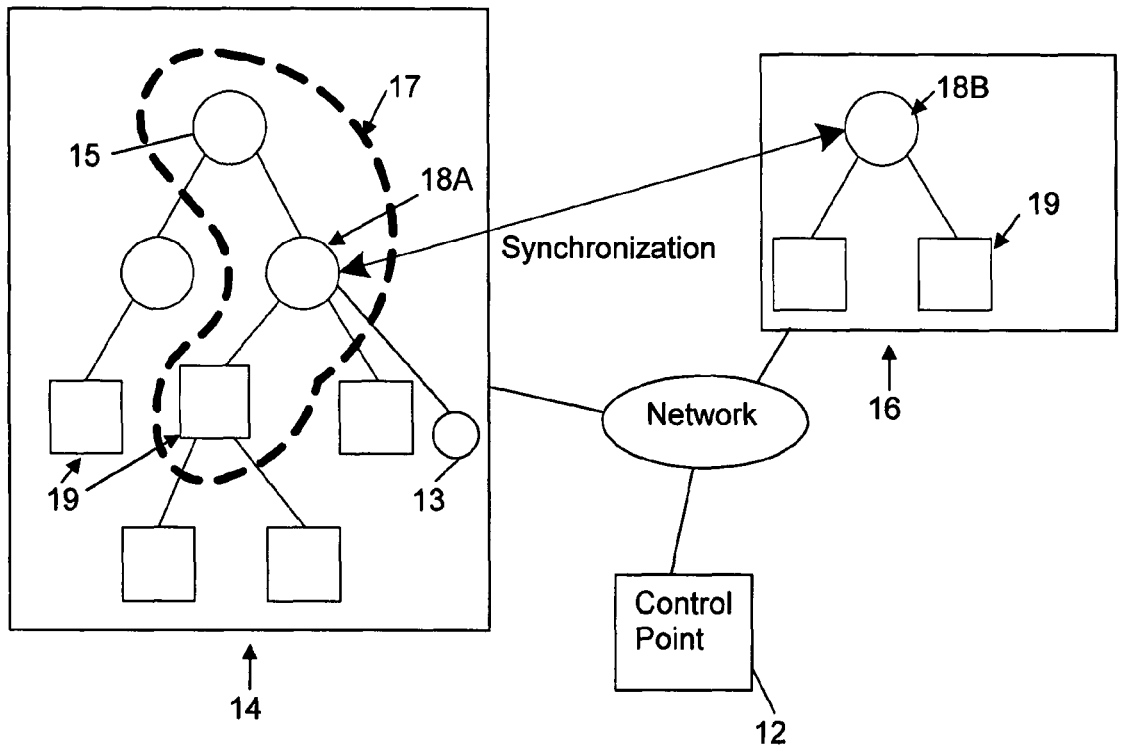
FIG. 1 shows an example structure for synchronizing objects in the CDS containers in two devices in a network, according to the present invention.

FIG. 1 shows an example wherein a network 10 includes a control point (CP) 12 and two controlled devices 14 and 16. FIG. 1 also shows a synchronization group 17 described further below. Each of the controlled devices 14 and 16 implements a CDS including one or more containers. The controlled device 14 includes a container 18A and the controlled device 16 includes a container 18B. Each of the containers 18A and 18B includes one or more object(s) 19 and can include one or more other containers.

According to the present invention, generally a synchronization process initiated by a control point compares objects located in different CDSs in two or more controlled devices, in order to synchronize metadata and resources of objects in the CDS container(s) in one controlled device with that of the CDS container(s) in another controlled device. This allows the control point to perform synchronization operations without executing CDS functions (actions) multiple times, and to avoid synchronization recursion as described further below.

As such, the CP 12 performs synchronization by exporting and/or importing (e.g., uploading and/or downloading) metadata and resources in CDSs of the controlled devices 14 and 16. The synchronization process according to the present invention allows the CP 12 to configure a relationship between the CDS containers 18A and 18B once, and then trigger exporting/importing operations based on this relationship whenever synchronization is required.

To facilitate description and understanding of the examples described hereinbelow, certain synchronization terminology is now described:

Synchronization Container: A CDS container specified by a control point for synchronization. All descendants of a synchronization container are candidates for synchronization.

Synchronization Object: A CDS object to be synchronized. The object is a descendant of a synchronization container, and includes metadata (e.g., a Digital Item Declaration Language (DIDL)-Lite object) and its local resources in a CDS. A local resource herein is the resource that resides within a CDS in the same device, and not distributed across the network.

Synchronization Relationship: When two containers are synchronized with each other, the two containers have a synchronization relationship that is described by a synchronization descriptor.

Synchronization Information: Synchronization information represents all of the synchronization descriptors in a CDS. A synchronization descriptor provides the basic information to perform synchronization between two CDSs. The descriptor includes information such as a synchronization policy, a counterpart device, local synchronization objects, etc. A descriptor is created when a control point defines a new synchronization relationship between two synchronization containers. There are different synchronization descriptors for the different content synchronizations. One synchronization descriptor is created for each synchronization relationship.

Synchronization Policy: A control point (or user) creates a synchronization policy that describes which of the involved controlled devices is a source/sink of synchronization information in export/import operations, and which controlled device has precedence when there are conflicts between changed objects in CDSs. A conflict occurs when a synchronization object is differently modified by each controlled device.

Synchronization Group: A group of containers related to a synchronization container. An example is the synchronization group 17 in FIG. 1, which includes all of the container ancestors 15 for a synchronization container 18A, up to the root and all of the container descendants 13 of the synchronization container 18A down to the leaves.

The control point establishes a synchronization relationship for synchronization relationship management, by selecting a CDS container in a controlled device as a synchronization container, to be synchronized with a CDS in another controlled device. All of the objects in the synchronization container automatically become the target of the synchronization operation. The control point creates a synchronization descriptor that includes a synchronization policy and other information necessary for synchronization. The control point can establish and remove a synchronization relationship, and after initiation of the content synchronization, the control point may leave the network.

The synchronization policy describes the type of content transfer. For example, a Type 1 transfer involves a "One-way" transfer wherein a CDS in one of two controlled devices is a source that provides synchronization object(s), and a CDS in another of the two controlled devices is a sink that receives synchronization objects from the source. The CDS in the source device is not changed. The sink device removes all of the content in a synchronization container in the sink device, except for certain "protected" content, and updates a CDS container in the sink device with the objects received from the source device during the synchronization operation. A Type 2 transfer operation involves a "Two-way" transfer wherein the two controlled devices can be a source and a sink, and transfer content to each other. One of the controlled devices has precedence for preventing conflict over a synchronization object. The synchronization policy further includes property-based policies.

During a synchronization operation between a pair of controlled devices, one controlled device synchronizes synchronized objects provided by the counterpart (peer) controlled device. Once the synchronization relationship is established by the control point for two controlled devices, one of the controlled devices manages and provides synchronization objects for the counterpart controlled device. The controlled device provides synchronization objects that are changed from the last synchronization.

During a synchronization operation, a controlled device decides whether a synchronization object is fully or partially synchronized. Two objects are fully synchronized when they have identical metadata and resources with certain specific exceptions. Two objects are partially synchronized when some, but not all, metadata and resources are synchronized.

A controlled device also determines the types of objects to be synchronized after receiving an indication of a change in the state of the objects. After completing a synchronization operation successfully, the two controlled devices may have different sets of objects due to variant device capabilities (e.g., a mobile MP3 player that has a CDS capability only for audio, video and image content, but not a tuner, playlist, etc.). As such, a synchronization specification describes how to handle the capabilities (properties) of each object that a controlled device supports. Further, a synchronization data integrity check allows a controlled device to exclude particular objects that are not to be included in the synchronization objects. The synchronization operation is terminated when a controlled device synchronizes all of the synchronization objects that are provided by the counterpart controlled device.

Figure 2:
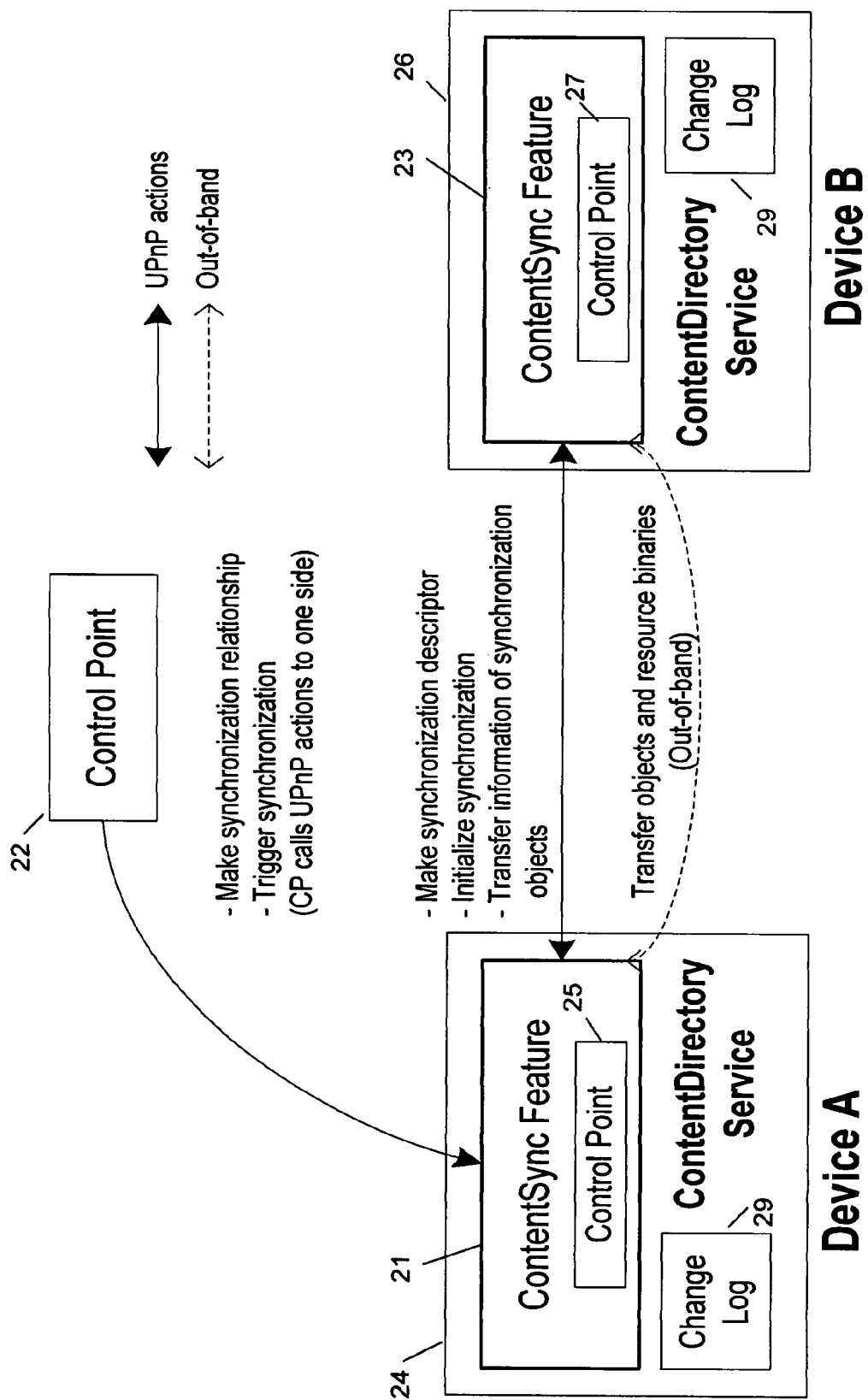
FIG. 2 shows another, more detailed, example of synchronizing objects in the CDS containers in two devices in a network, according to the present invention.

An example of establishing a synchronization relationship between controlled devices in a network is now described. FIG. 2 shows an example network 20 including a CP 22 that controls two controlled devices 24 and 26 (designated as device A and device B), wherein each of the controlled devices includes a CDS. The controlled device 24 further includes a ContentSync function (i.e., ContentSync feature) 21, and the controlled device 26 further includes a ContentSync function (i.e., ContentSync feature) 23. Each ContentSync function in a controlled device maintains information for synchronization such as a synchronization relationship and object change states for a peer device. The ContentSync functions 21 and 23 in the devices 24 and 26 further include Control Point functions 25 and 27, respectively, which allow the devices 24 and 26 to communicate with each other.

The CP 22 collects synchronization information from the ContentSync functions 21 and 23 in the devices 24 and 26, respectively. The CP 22 finds existing synchronization relationships between the devices 24, 26 (e.g., BrowseSyncRelationships ( ) action). A UPnP removal action (e.g., RemoveSyncRelationship ( ) action) allows the CP 22 to remove a synchronization relationship. The CP 22 can decide whether or not to synchronize objects that are part of a synchronization relationship. If the CP 22 decides that such objects no longer need to be synchronized, then the CP 22 can remove the synchronization relationship involving such objects. Multiple synchronization relationships can exist for a CDS. In one example, a user utilizes a control point to create a synchronization relationship for synchronizing the content of a computer with a personal digital assistant (PDA). After some time, the user decides that she no longer wants to synchronize the computer with the PDA, and remove that synchronization relationship. This type of removing of a relationship is independent of detecting/removing synchronization loops.

Next, the CP 22 creates a new synchronization relationship between the controlled devices 24 and 26 (e.g., CreateSyncRelationship ( ) and CreatePeerSyncRelationship ( ) actions), and also creates a descriptor that describes the new synchronization relationship.

A synchronization operation between the two controlled devices 24 and 26 is implemented as a master (source) device (e.g., Synchronize ( ) action) and a slave (sink) device (e.g., InitializeSync ( ) action).

Synchronization is performed per container. In a one-way synchronization example, the CP 22 selects a specific container in the CDS of a sink controlled device as a synchronization container (e.g., the synchronization container 18A in FIG. 1). The ContentSync function for the sink controlled device uses a change log 29 therein to keep track of changing information for all objects in the synchronization container. Change logs are kept in the CDS object property. Every object keeps track of what has been changed. When the CP 22 triggers synchronization, the two controlled devices exchange object change states from their logs 29. Based on the received object change states, the sink controlled device obtains resources from the CDS of the source controlled device and updates the synchronization container in the sink controller device CDS.

A ContentSync feature (e.g., ContentSync functions 21, 23) implemented by a CDS in a controlled device, manages synchronization relationships, detects synchronization recursion (loops), and performs synchronization with a peer controlled device via the embedded Control Point function (e.g., Control Point functions 25, 27). Because synchronization involves an interaction between two CDSs in peer devices, the embedded Control Point function of each CDS in a controlled device controls the ContentSync function of a CDS in a peer controlled device. The UPnP architecture does not allow interactions between UPnP devices, but provides interaction between a control point and a UPnP device. For content synchronization, the UPnP controlled devices that are part of synchronization, communicate with each other using the control point function via the control point. In this manner, peer controlled devices communicate for operations such as retrieving a change log from one another, retrieving synchronization relationship information, etc. The ContentSync function utilizes the corresponding change log in the CDS to describe which objects are added to, modified or deleted from that CDS since a last synchronization.

The CP 22 determines the status of a synchronization operation using state variables based on an eventing mechanism (e.g., GetSyncProgress ( ) action), and can abort the synchronization operation (e.g., AbortSync ( ) action). Further, a set of rules ensure consistency between the CDSs in the devices 24 and 26, on completion of a synchronization operation.

Any synchronization relationship that can cause structural recursion in a single container must be detected and prevented. While a synchronization operation is in progress, relevant synchronization objects in a synchronization container should not be changed. In one example, recursion can occur when a synchronization operation "A" changes the synchronization objects of another synchronization operation "B". This causes re-initiation of the synchronization operation "B" which changes synchronization objects of synchronization operation "A". This again causes re-initiation of the synchronization operation "A" that changes synchronization objects of synchronization operation "B", and so on. This causes an endless synchronization recursion (looping).

Figure 3:
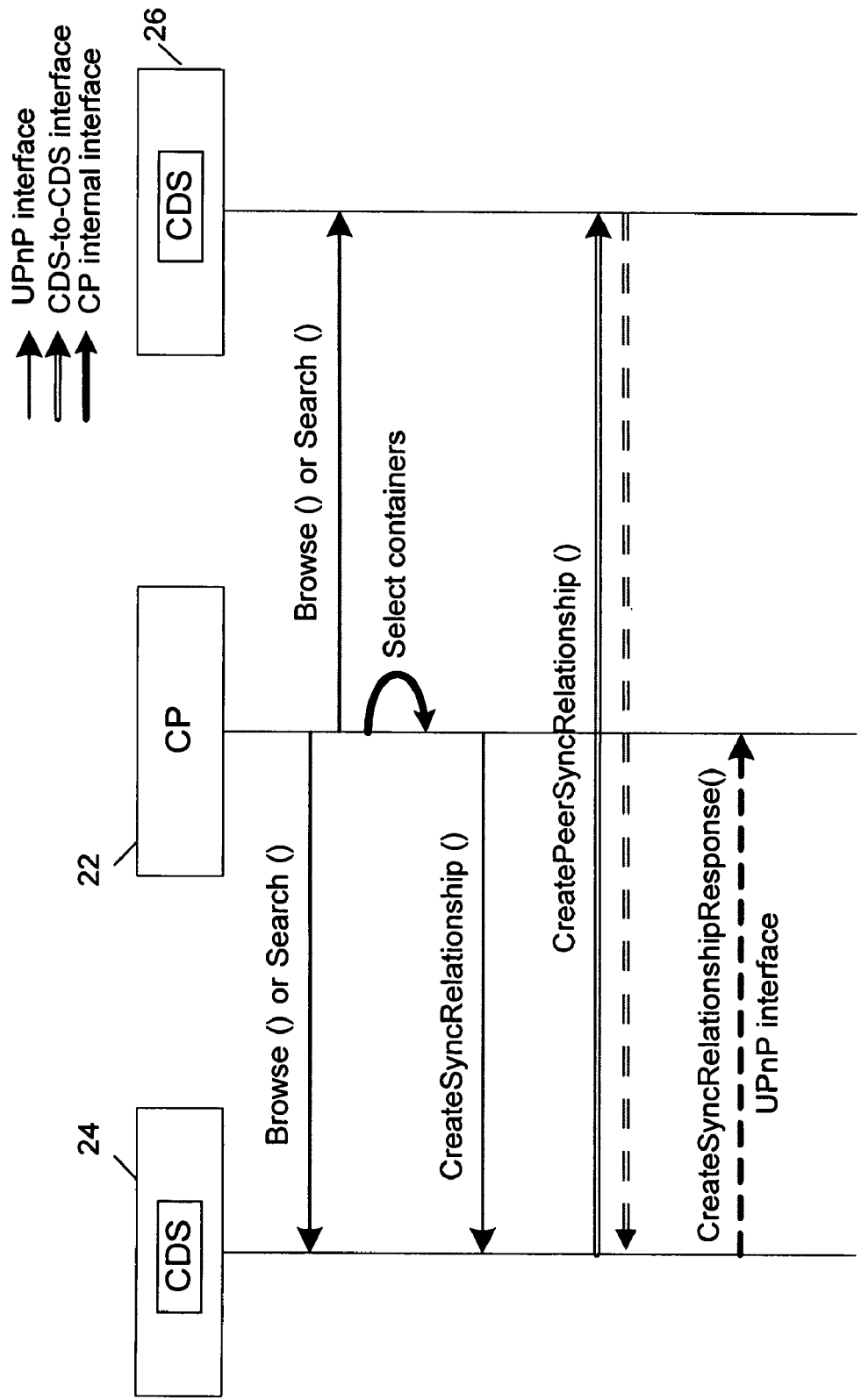
FIG. 3 shows an example of synchronization set up for content synchronization in the network of FIG. 2.
Figure 4:
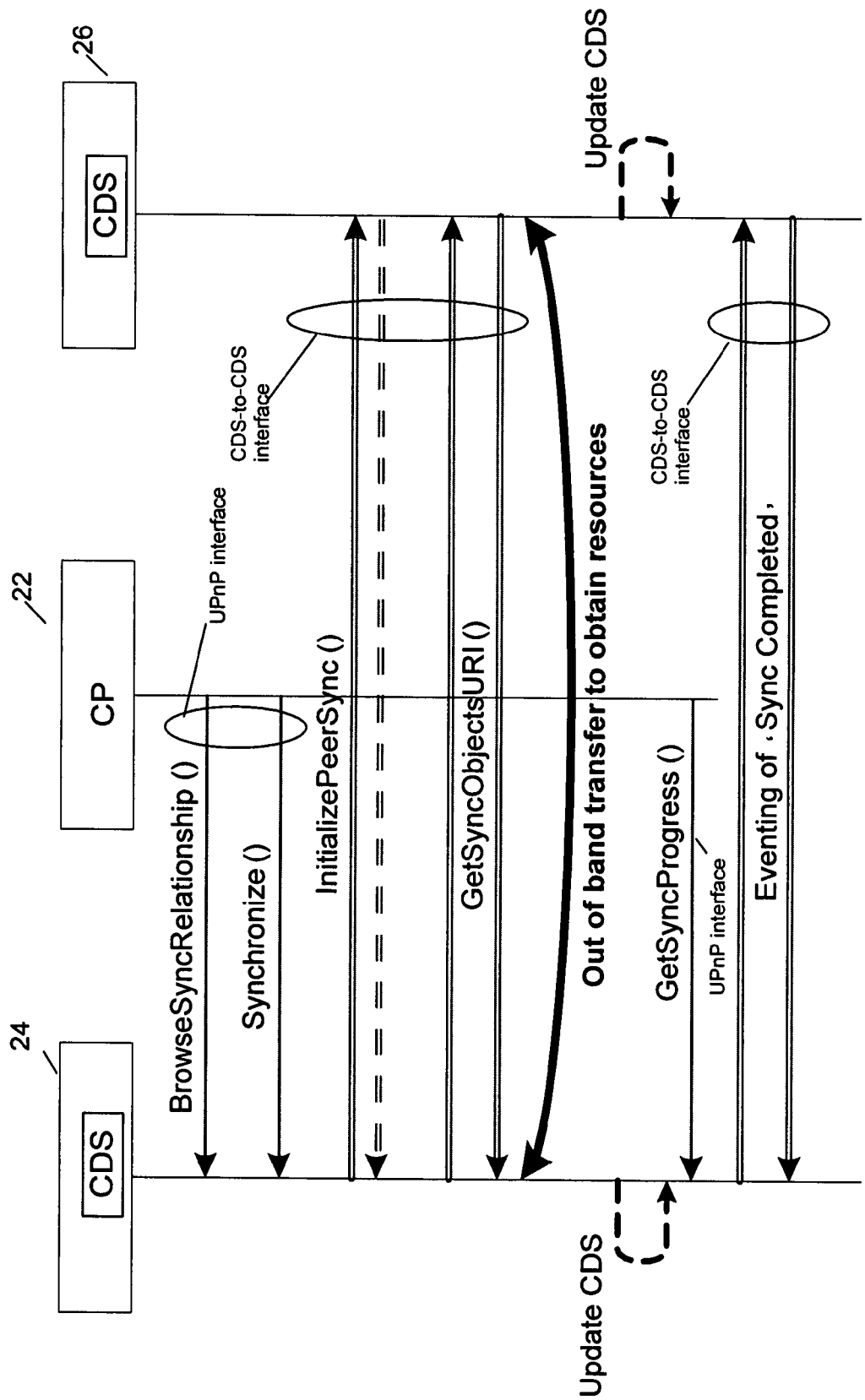
FIG. 4 shows an example of a synchronization operation for content synchronization in the network of FIG. 2.

FIGS. 3-4 illustrate example synchronization steps in the network 20 of FIG. 2 (also applicable to network 10 in FIG. 1), including a synchronization initialization phase (FIG. 3) and a synchronization operation phase (FIG. 4), as follows. All of the action names used in the description herein (e.g., Browse ( ), Search ( ), CreateSyncRelationship ( ), etc.) are for example purposes only, and have been used simply as aids in describing the example embodiments of the present invention. As those skilled in the art will recognize, other names for the actions (or other actions) that perform the described functions and achieve the described results can also be used.

I. Synchronization Information Initialization and Setup

1. The CP 22 invokes Browse ( ) or Search ( ) actions to retrieve CDS objects from each device 24 and 26, and selects a container (e.g., in the device 24) to be synchronized.
2. The CP 22 creates a "Synchronization Relationship" with the selected container, including the steps of:
   A. The CP 22 invokes a CreateSyncRelationship ( ) action to the device 24 with an initial synchronization relationship that contains a synchronization title, synchronization policy and peer device information.
   B. When the device 24 receives the CreateSyncRelationship ( ) action, the device 24 responds to the CP 22 with a "Synchronization Relationship ID" that is created internally and should be unique.
   C. Further, upon receiving the CreateSyncRelationship ( ) action, the device 24 parses the initial synchronization relationship and finds the peer device information which includes synchronization container information. After parsing the initial synchronization relationship, the device 24 performs the following steps:
      i. The embedded Control Point function 25 of the device 24 invokes a CreatePeerSyncRelationship ( ) action on the peer device 26 to create a synchronization relationship on the peer device 26, wherein synchronization relationship has an identification (SyncID).

ii. While invoking the CreatePeerSyncRelationship ( ) action, the device 24 passes the newly created Synchronization Relationship ID (i.e., SyncID) to the peer device 26. If the peer device 26 cannot use the synchronization relationship ID as the unique ID, the peer device 26 responds with an error code (e.g., 7xx) which means that the given SyncID is not unique. When the device 24 receives such an error response, the device 24 invokes a CreatePeerSyncRelationship ( ) action again on the peer device 26 with a different synchronization relationship ID and this process continues until either the response of the action is successful (i.e., a unique SyncID has been established for this synchronization relationship) or a maximum time limit (e.g., 30 seconds) for the response has been reached. As such the value of each object's SyncID is globally unique.

II. Synchronization Operation

1. When the CP 22 is to synchronize the devices 24, 26, the CP 22 invokes a BrowseSyncRelationship ( ) action to the device 24 to obtain the current synchronization information. The result of this action is a collection of synchronization relationships, whereby the CP 22 selects a synchronization relationship from the collection.

2. The CP 22 triggers a synchronization operation by invoking a Synchronize ( ) action on one of the devices in the synchronization relationship (e.g., device 24). The CP 22 passes the synchronization relationship ID to identify a synchronization relationship in the action. As a result, the device 24 performs the following steps:

A. The device 24 receives the Synchronize ( ) action from the CP 22 and prepares for the synchronization operation by checking all of the objects in its CDS relevant to the given synchronization relationship. Each object that is locked by another control point cannot be modified during this synchronization operation. The device 24 locks all of the unlocked objects in its CDS so that they cannot be changed.

B. After locking the unlocked objects, the device 24 invokes an InitializePeerSync ( ) action on the peer device 26 to start the initialization of the peer device 26. When the peer device 26 receives the InitializePeerSync ( ) action, it also prepares for the synchronization operation by locking all of the unlocked objects in its CDS for this synchronization relationship.

3. The two devices 24 and 26 proceed to synchronization as follows:

A. Each device determines the changes in the log 29 of its peer device by invoking a GetSyncObjectsURI ( ) action on the peer device, and receives an address from the peer device that points to synchronization objects in the CDS of the peer device for updating the local CDS. For example, the device 24 determines the changes in the log 29 of the peer device 26 by invoking a GetSyncObjectsURI ( ) action on the peer device 26, and receives an address from the device 26 that points to synchronization objects in the CDS of the peer device 26 for updating the local CDS in the device 24.

B. After receiving a response to the GetSyncObjectsURI ( ) action, each controlled device retrieves a collection of synchronization objects from a peer device, e.g., by connecting to the received address using an HTTP protocol format.

C. Upon obtaining synchronization objects, each controlled device updates its own (i.e., local) CDS.

D. Each controlled device also transfers resources using an HTTP GET method as the transport protocol. Then each controlled device updates the status of the synchronization relationship for each object in its local CDS to indicate whether the synchronization for that object was successful or otherwise.

4. If a controlled device receives an event message from the peer controlled device indicating the end of synchronization, the receiving controller device ends the synchronization and releases the locked objects for this synchronization operation.

Figure 5:
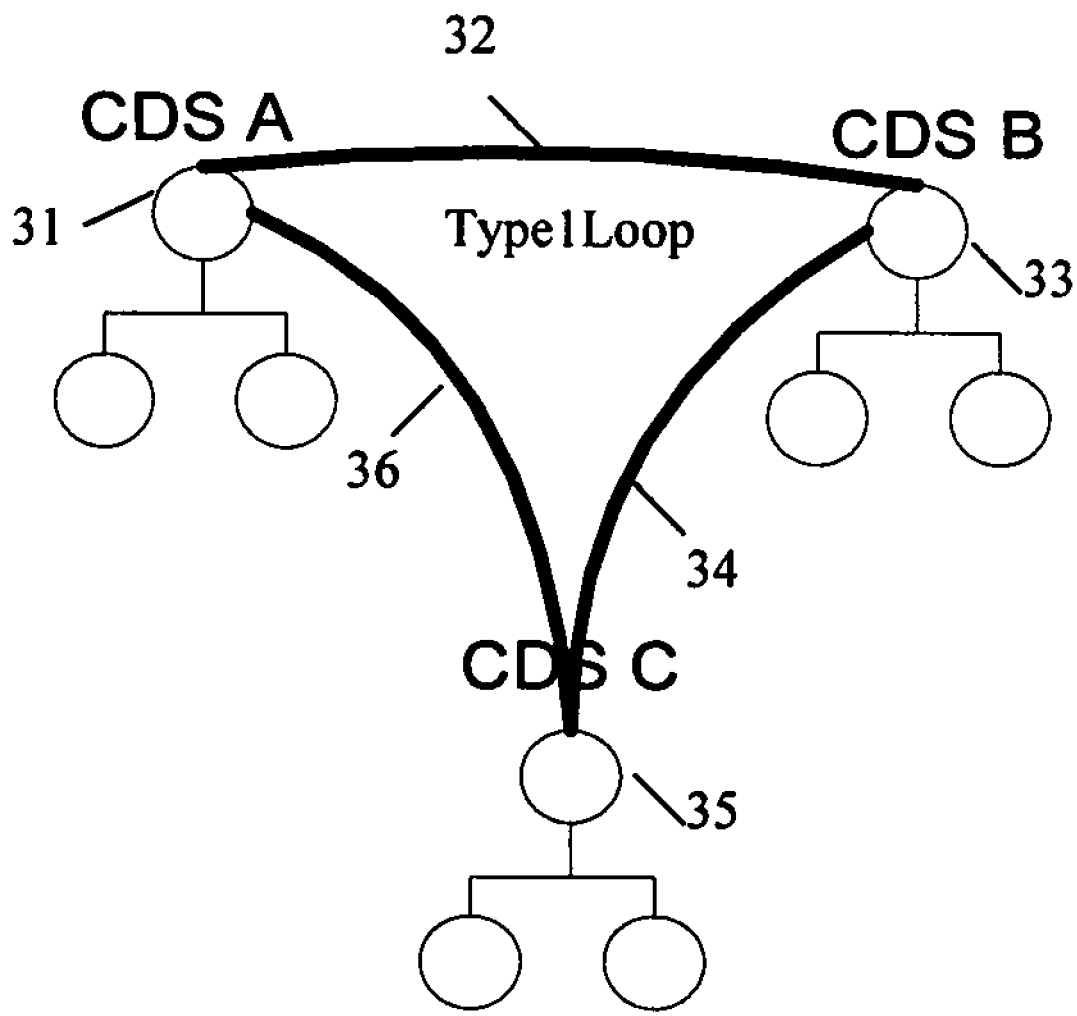
FIG. 5 shows an example synchronization loop in a network including three devices.

The creation of a new synchronization relationship can create a loop in combination with one or more other already existing synchronization relationships. Two types of loops have been identified:

1. A Type1Loop is a loop that is created with synchronization relationships comprising only synchronization root containers in the CDSs. FIG. 5 shows an example of the Type1Loop in a network 30 of controlled devices including CDS A, CDS B and CDS C. The synchronization relationship 32 between CDS A and CDS B, the synchronization relationship 34 between CDS B and CDS C, and the synchronization relationship 36 between CDS C and CDS A, include only synchronization root containers 31, 33 and 35, respectively.

Figure 6:
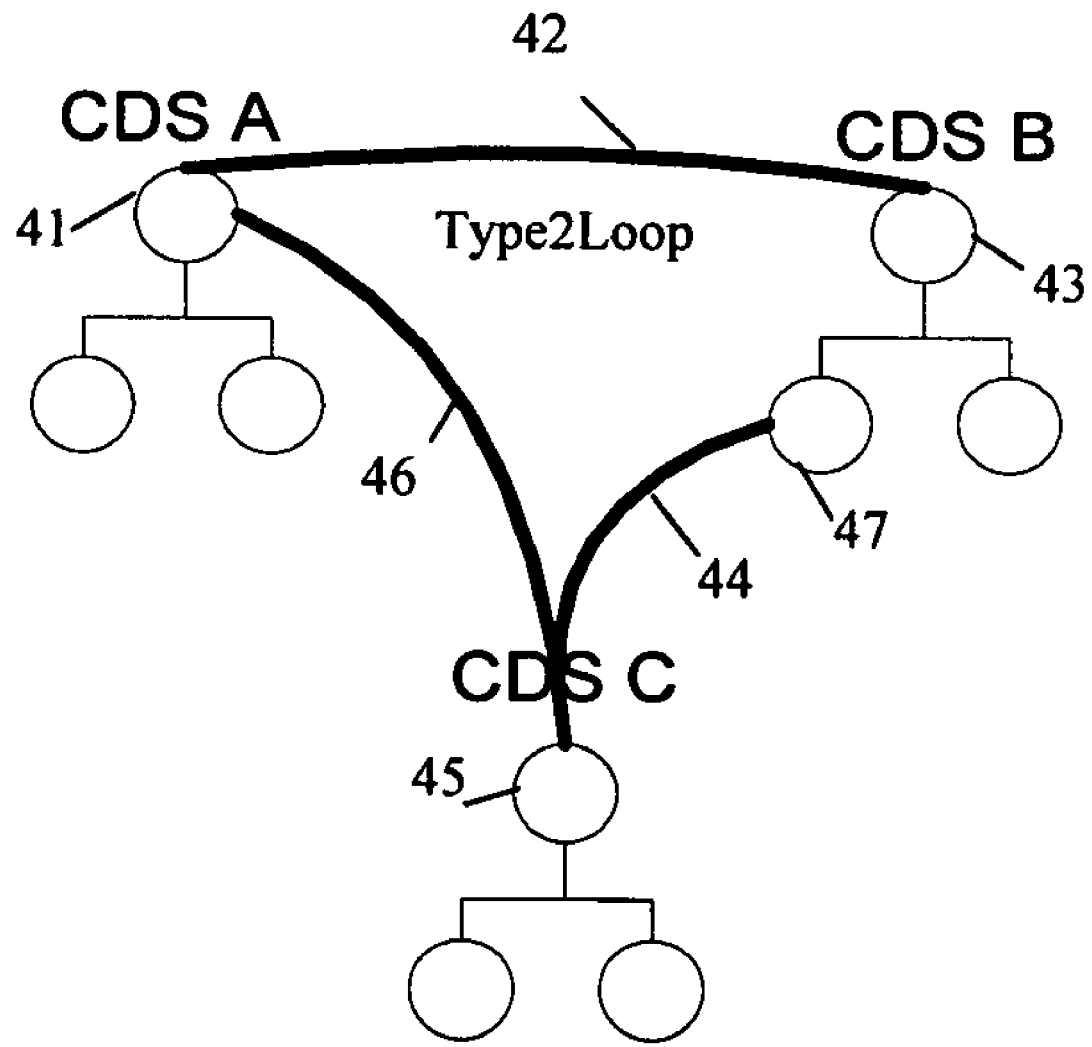
FIG. 6 shows another example synchronization loop in a network including three devices.

2. A Type2Loop is a loop that is created with synchronization relationships comprising synchronization root containers and the lineage of synchronization root containers. FIG. 6 shows an example of Type2Loop in the network 40, of controlled devices including CDS A, CDS B and CDS C. The synchronization relationship 42 between CDS A and CDS B includes root containers 41 and 43. The synchronization relationship 46 between CDS C and CDS A includes root containers 41 and 43. However, the synchronization relationship 44 between CDS B and CDS C includes the root container 45, and the lineage 47 of the root container 43 at CDS B.

FIGS. 7A-E show an example network 70 including three controlled devices, each including a CDS, designated as CDS A, CDS B and CDS C. FIGS. 7A-E show a progression in the network 70 where a Type2Loop is formed and leads to synchronization recursion. Synchronization recursion causes the CDS hierarchy to grow indefinitely by copying the same objects during every synchronization operation, as shown in FIGS. 7A-E. In the network 70 of FIG. 7A, a synchronization relationship 71 is formed between the root containers in CDS A and CDS B, and a synchronization relationship 72 is formed between the root containers CDS C and CDS A. However, in FIG. 7B (similar to FIG. 6), a synchronization relationship 73 between CDS C and CDS B includes the root container at CDS C and also a lineage 74 of the root container at CDS B. Then, in FIG. 7C a synchronization operation based on the synchronization relationship 71 between CDS A and CDS B, results in copying of the lineage structure 74 from CDS B to CDS A as a new lineage structure 75 in CDS A. This change causes a synchronization operation based on the synchronization relationship 72 between CDS C and CDS A, which in turn results in copying of said new lineage structure 75 from CDS A to CDS C as a further lineage structure 76 (FIG. 7D). This change in turn causes a synchronization operation based on the synchronization relationship 73 between CDS C and CDS B which results in copying of said further lineage structure 76 from CDS C to CDS B as a yet further lineage structure 77 (FIG. 7E). And, so on. Therefore, the CDS hierarchy including the Type2Loop grows indefinitely by copying the same objects during every synchronization operation.

Figure 8A:
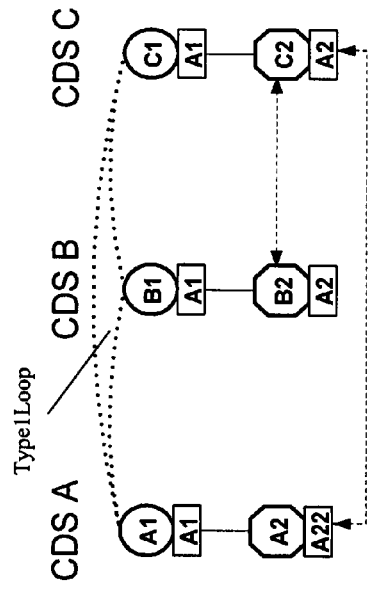
FIGS. 8A-D show an example of object mapping conflict due to a synchronization loop.

FIGS. 8A-D show a network 80 including three controlled devices, each including a CDS, designated as CDS A, CDS B and CDS C. FIGS. 8A-D show a progression in the network 80 wherein a Type1Loop is formed between CDS A, CDS B and CDS C, and leads to object mapping conflicts. In FIG. 8A, the synchronization relationships 81, 82, 83 between root containers Ⓐ and Ⓑ, Ⓑ and Ⓒ, and Ⓐ and Ⓒ, respectively, form a Type1Loop.

The objects Ⓐ₂, Ⓑ₂ and Ⓒ₂ are in the containers Ⓐ, Ⓑ and Ⓒ, respectively. The containers Ⓐ, Ⓑ and Ⓒ all have the same ancestor SyncID of [A1]. The objects Ⓐ₂, Ⓑ₂ and Ⓒ₂ maintain peer information that means each of these objects maintains its peer's ID (e.g., remoteObjID). The objects Ⓐ₂, Ⓑ₂ and Ⓒ₂ also have the same ancestor SyncID of [A2] since the objects Ⓑ₂ and Ⓒ₂ are spawned from the same object which is Ⓐ₂ with an ancestor SyncID [A2].

Figure 8B:
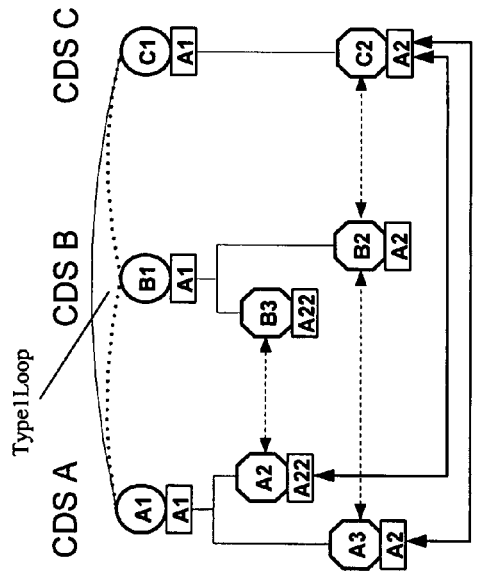

FIG. 8B shows a scenario where object Ⓐ₂ is modified in such a way that it is no longer the same type of object and a user wishes to treat this object differently from object Ⓑ₂. In order to achieve this, the user breaks the relationship between the containers Ⓐ and Ⓑ permanently, by removing object mapping information and changing the ancestor SyncID of objects Ⓐ₂ (or Ⓑ₂). For example, the ancestor SyncID of the object Ⓐ₂ is changed to an ID of [A22].

Figure 8C:
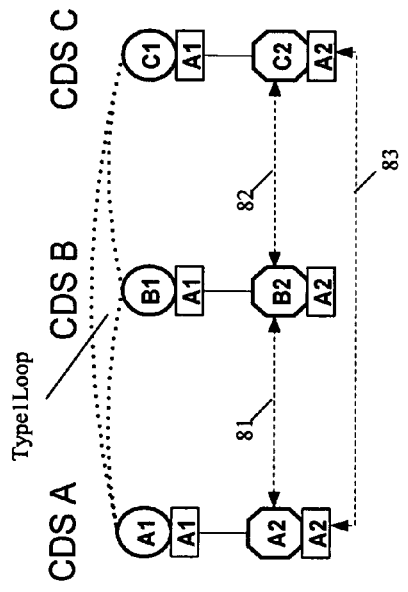

FIG. 8C shows a scenario where a synchronization relationship is again created between the containers Ⓐ and Ⓑ. CDS A will recognize the object Ⓑ₂ as a newly added item since the ancestor SyncID of the object Ⓑ₂ does not match with the ancestor SyncID of the object Ⓐ₂. After the synchronization between the containers Ⓐ and Ⓑ, CDS A creates a new object Ⓐ₃ with an ancestor SyncID [A2] and maintains the object mapping information with the object Ⓑ₂. Likewise, CDS B views the object Ⓐ₂ as a new object, and creates a new object Ⓑ₃, synchronizes it with the object Ⓐ₂ and maintains mapping information.

Figure 8D:
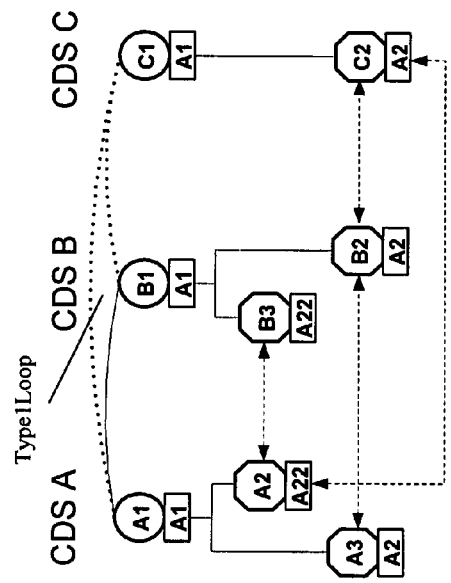

FIG. 8D shows a scenario where the container Ⓐ synchronizes with the container Ⓑ. When the container Ⓐ synchronizes with the container Ⓒ, the object Ⓒ₂ is synchronized with the object Ⓐ₂ as before because they are linked together by mapping information. At the same time, CDS C finds the object Ⓐ₃ in CDS A with an ancestor SyncID of [A2]. As usual, CDS C attempts to find another object with ancestor SyncID of [A2], to synchronize them together. However, CDS C finds that the ancestor SyncID of the object Ⓒ₂ is the SyncID [A2] and it already has a relationship with another container (or object) Ⓐ₂. In this scenario, multiple items in CDS A are attempting to synchronize with a single object in CDS C, which is an example of object conflict due to a Type1Loop.

In order to avoid synchronization recursion, object conflict, and other problems caused by loops, the present invention provides a process for detecting loops when the control point creates a synchronization relationship between a pair of peer controlled devices (e.g., a first peer device and a second peer device).

Each object is assigned a unique identification (ObjectID), when created. For synchronization, an object is further assigned a SyncID, which can be the same as an objectID. The SyncID is copied when the object is synchronized with another object, such that both objects have the same SyncID. Each synchronizing container also includes a synchronization container ID (correspondingSyncContainerID) which is assigned when the container is created.

To establish a synchronization relationship when the second peer device is a source and the first peer device is a sink, including a synchronization container, the second peer device passes a correspondingSyncContainerID to the first peer device. When attempting to create the synchronization relationship, the first peer device examines whether the correspondingSyncContainerID passed from the first peer device exists in a synchronization group for the synchronization relationship in the first peer device. If the correspondingSyncContainerID passed from the second peer device matches with one of the synchronization container IDs of the local synchronization group in the first peer device, then the synchronization relationship that is being created may cause a Type2Loop which leads to synchronization recursion.

For example, in FIG. 1, in order to synchronize container 18B with container 18A, the second peer device 16 passes the correspondingSyncContainerID for the container 18B to the first device 14. The first peer device 14 examines whether the correspondingSyncContainerID of the container 18B, exists in the synchronization group 17 for the local synchronization relationship in the first peer device 14. If the correspondingSyncContainerID for the container 18B matches with one of the synchronization container IDs of the local synchronization group 17, then the synchronization relationship that is being created may cause a Type2Loop which leads to a synchronization recursion.

To determine whether a synchronization recursion will occur during a synchronization operation based on the synchronization relationship, the first peer device checks the level of synchronization containers with the same correspondingSyncContainerID. If those containers are ancestors or descendants with the same level apart from the synchronization container, then the new synchronization relationship will not lead to a synchronization recursion. Otherwise, the relationship will lead to a synchronization recursion, and as such the relationship is not created. If containers are ancestors or descendants with the same level apart from the synchronization container, this means that they are at the same hierarchical level. For example, a CDS 1 has a container A1 with children B1 and C1, a CDS 2 has a container A2 with children B2 and C2, and a CDS 3 has a container A3 with children B3 and C3. Creating a synchronization relationship for B1, B2 and B3 is unlikely to create a synchronization loop as B1, B2 and B3 are at the same hierarchical level. However, creating a synchronization relationship for A1, A2 and B1 will create a loop as A1, A2 and B1 are in different hierarchical levels.

A synchronization recursion also occurs when containers that have a lineage (child-parent) relationship, are synchronized with a specific container of a peer device directly. To detect such a situation, a SyncID is provided for each object in a CDS container where the ContentSync function is supported. The SyncID uniquely identifies an object that can be synchronized (syncable) in the network and is propagated (copied) from one CDS to another when the object is synchronized. In addition, the value of a SyncID for an object must not change during the lifetime of the object, and must not be reassigned to another object or reused even after the object is removed from a CDS.

Figure 9:
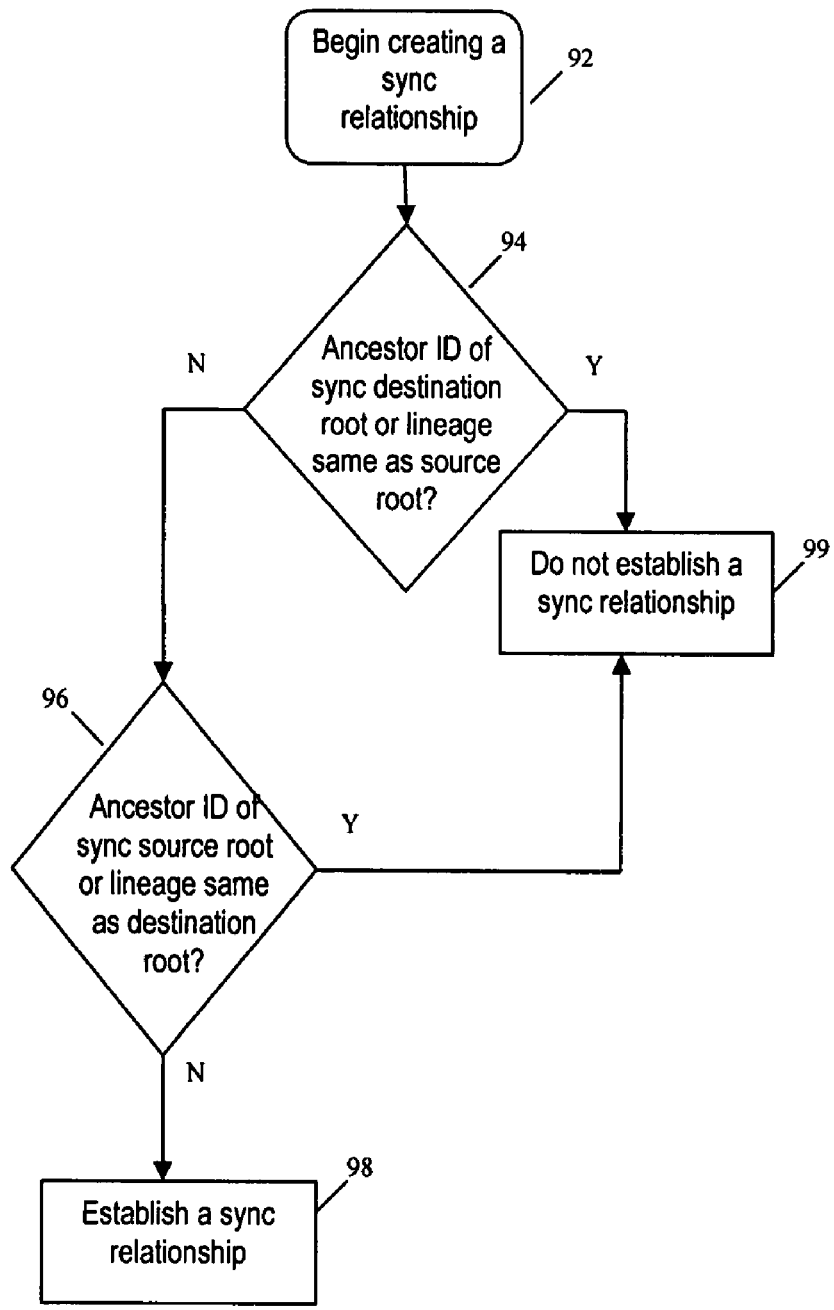
FIG. 9 shows a flowchart of a process for detecting a loop during the creation of a synchronization relationship, according to an embodiment of the present invention.

FIG. 9 shows a flowchart of a process 90 for detecting a loop during the creation of a synchronization relationship, according to an embodiment of the present invention, including the steps of:

Step 92: Begin creating a synchronization (sync) relationship between a pair of peer devices, each including a CDS.

Step 94: A first peer device checks if the synchronization destination root container/object or one of its lineages (descendant or ancestor) in a CDS of the first peer device, has the same ancestor SyncID as that of a source root container/object in a CDS in the second peer device. Establishing a synchronization relationship for containers with a syncID that is the same as the SyncID of its parent, may create a loop. For example, when a CDS A has children B and C, wherein A is the ancestor of B, if B has the same syncID as A, then B has the same syncID as its ancestor. If yes, go to step 99, otherwise go to step 96.

Step 96: The second peer device checks if the synchronization source root container/object or one of its lineages (descendant or ancestor) in the CDS of the second peer device has the same ancestor SyncID as that of the destination root container/object in the CDS in the first peer device. If yes, go to step 98, otherwise go to step 99.

Step 98: Establish a synchronization relationship between the synchronization destination root container/object and the source root container/object.

Step 99: Establishing a synchronization relationship between the synchronization destination root container/object and the source root container/object will create a loop and is therefore avoided.

When creating a synchronization relationship, a sink (destination) peer device checks if the synchronization destination root container/object or one of its lineages (descendant or ancestor) in the CDS of the sink peer device, has the same ancestor SyncID as that of a source root container/object in the CDS of the source peer device. If yes, then such a relationship will create a loop and is not established. Likewise, the source peer device checks if the ancestor SyncID of the synchronization source root container/object or any of its lineage is the same as the synchronization destination root container/object. If yes, then such a relationship will create a loop and is not established.

Figures 10A, 10B:
FIG. 10A shows an example of detecting a loop during the creation of a synchronization relationship, according to the present invention.
FIG. 10B shows another example of detecting a loop during the creation of a synchronization relationship, according to the present invention.

FIG. 10A shows an example of detecting a loop during the creation of a synchronization relationship. In FIG. 10A while creating a synchronization relationship between synchronization peers, comprising a source device including CDS A and a sink device including CDS B, the sink device checks if the destination root container/object Ⓑ or one of its lineages (descendant or ancestor) in CDS B has the same ancestor SyncID as that of the corresponding source root container/object Ⓐ in CDS A. If yes, then the synchronization relationship will create a loop. The lineage is not limited to a parent or child, and includes all descendents and ancestors of a container/object. Since the source root container/object Ⓐ and a descendent Ⓑ₂ of the destination root container/object Ⓑ have the same ancestor SyncID of Ⓐ₁, then creation of a synchronization relationship between Ⓐ and Ⓑ will create a loop, and is therefore avoided.

In another example shown in FIG. 10B, while creating a synchronization relationship between synchronization peers, comprising a source device including CDS B and a sink device including CDS A, the source device checks the ancestor SyncID of the destination container/root object Ⓑ in CDS B through its lineage. If the source root container/object Ⓑ₂ or one of its lineages (descendants or ancestors) has the same ancestor SyncID as that of the corresponding destination root container/object Ⓐ, the synchronization relationship will create a loop, and is avoided. Since an ancestor Ⓑ of the source root container/object Ⓑ₂ has the same ancestor SyncID of Ⓐ₁ as the destination container/object Ⓐ, then the creation of a synchronization relationship between Ⓐ and Ⓑ₂ will create a loop, and is therefore avoided.

A Type1Loop can be detected during the creation of a synchronization relationship. Further, in most instances, a Type2Loop is detectable during the creation of a synchronization relationship. However, in some instances, a Type2Loop may not be detectable during the creation of a synchronization relationship. FIGS. 11A-D show such a Type2Loop scenario, detectable during creation of a synchronization relationship. FIG. 11A shows CDS A, CDS B and CDS C, which include containers (objects) Ⓐ, Ⓑ and Ⓒ, respectively. In FIG. 11B, CDS A synchronizes with CDS B, wherein CDS B creates a new synchronization root container Ⓑ₂ as a destination root container. In FIG. 11C, CDS C synchronizes with CDS B, wherein CDS C selects Ⓑ₂ as a parent of a destination root container. CDS B then creates a synchronization root container Ⓑ₃. In FIG. 11D, CDS A synchronizes with CDS C, wherein CDS A selects Ⓒ as a parent of a destination root container, and CDS C creates a synchronization root container Ⓒ₂.

As illustrated in FIG. 11D, a Type2Loop synchronization loop is created while forming a relationship between CDS C and CDS A. However, this loop cannot be detected during the relationship creation time using the above-mentioned loop detections. However, the Type2Loop loop can be detected during a synchronization operation. While performing a synchronization operation, all the devices will be in the network and a device will be able to obtain synchronization relationship information from other devices and can determine whether this will create a loop. As such, the present invention further provides loop detection when performing a synchronization operation, whereby when a CDS in a peer device finds that the same copies of a synchronization root object are created in the descendants (i.e., any descendants under the root object); the CDS terminates the synchronization operation and reports an error.

Figure 12:
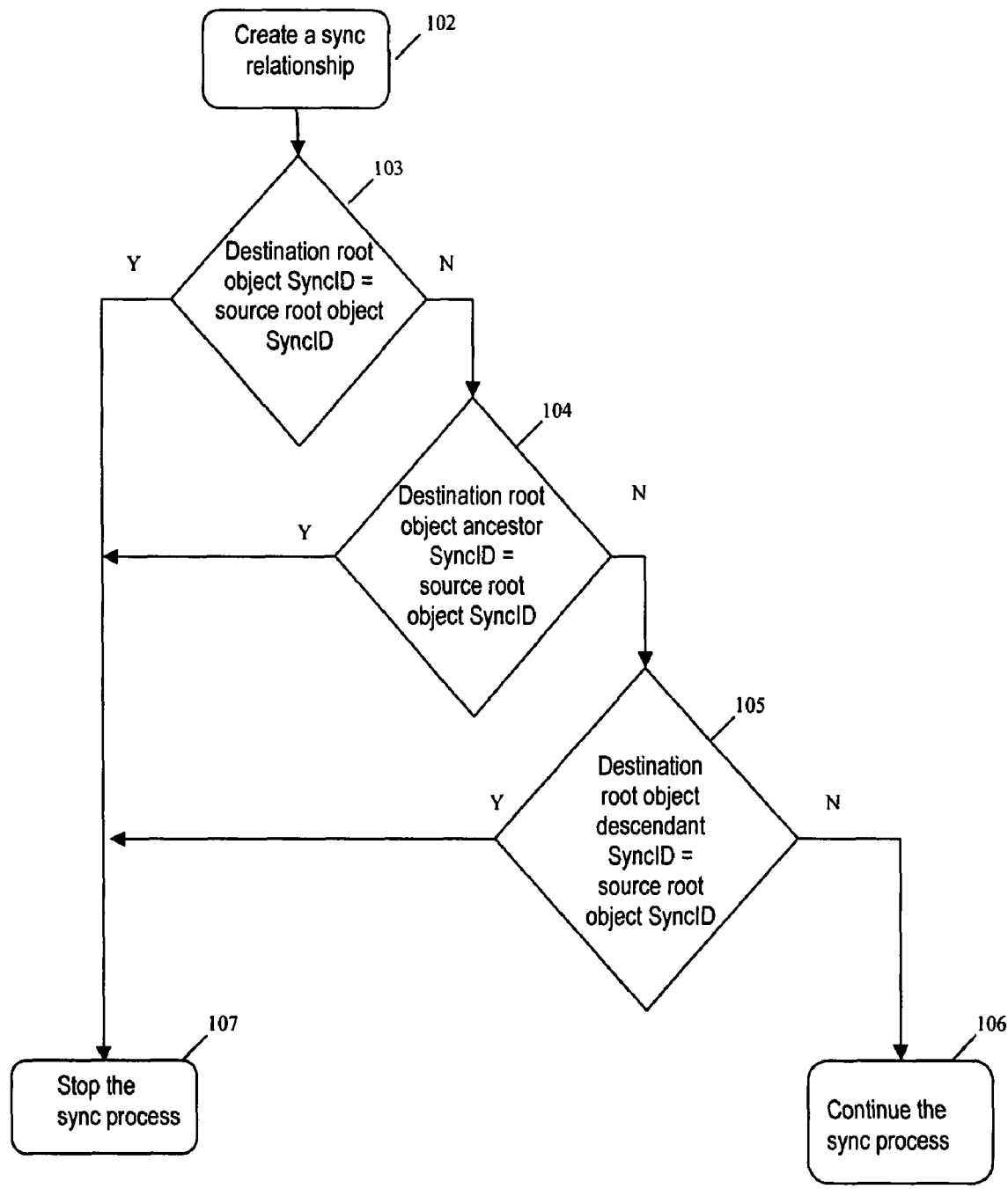
FIG. 12 shows a flowchart of a process for detecting synchronization loops during a synchronization process, according to an embodiment of the present invention.

FIG. 12 shows a flowchart of a process 100 for detecting a Type2Loop loop synchronization during the synchronization process, including the steps of:

Step 102: Create a synchronization (sync) relationship between a source device including a source root object and a sink device including a destination root object.

Step 103: Begin synchronization, and check if the destination root object SyncID is the same as the source root object SyncID. If yes, go to step 107, otherwise go to step 104.

Step 104: Check if the destination root object's ancestor SyncID is the same as the source root object SyncID. If yes, then go to step 107, otherwise, go to step 105.

Step 105: Check if the destination root object's descendant SyncID equals the source root object SyncID. If yes, then go to step 107, otherwise go to step 106.

Step 106: Continue the synchronization process.

Step 107: Terminate the synchronization process, and report error.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of synchronizing content in a network including two or more devices, the method comprising:
   providing a content directory service (CDS) in each device, wherein each CDS comprises a hierarchical structure of containers for storing data objects, wherein each container includes a globally unique identification; and creating a synchronization relationship between each pair of devices among said two or more devices for synchronizing objects in selected containers, wherein each object includes a globally unique identification, such that a combination of said synchronization relationship with one or more existing synchronization relationships, is free of a recursive synchronization loop, wherein creating a synchronization relationship further includes:

detecting whether creating the synchronization relationship creates a loop in combination with one or more existing synchronization relationships; and upon not detecting a loop, creating the synchronization relationship, otherwise, terminating the creation of the synchronization relationship.

2. The method of claim 1 wherein creating a synchronization relationship further includes creating the synchronization relationship only if a combination of said synchronization relationship with one or more existing synchronization relationships is free of a recursive synchronization loop.

3. The method of claim 1 wherein detecting if creating the synchronization relationship between a pair of devices creates a loop in combination with one or more existing synchronization relationships, further includes determining if a destination root object or one of its lineages has the same ancestor SyncID as that of an origin root object, indicating that the synchronization relationship will create a loop.

4. The method of claim 1 wherein detecting if creating the synchronization relationship between a source device and a sink device creates a loop in combination with one or more existing synchronization relationships, further includes:

the sink device determining if a destination root object or one of its lineages has the same ancestor SyncID as that of an origin root object, indicating that the synchronization relationship will create a loop; and the source device determining if a destination root object or one of its lineages has the same ancestor SyncID as that of an origin root object, indicating that the synchronization relationship will create a loop.

5. The method of claim 1 wherein detecting if creating the synchronization relationship between a source device and a sink device creates a loop in combination with one or more existing synchronization relationships, further includes:

the sink device determining if a destination root object or one of its lineages, in the source device has the same ancestor SyncID as that of an origin root object in the sink device, indicating that the synchronization relationship will create a loop; and the source device determining if a destination root object or one of its lineages, in the sink, has the same ancestor SyncID as that of an origin root object in the source device, indicating that the synchronization relationship will create a loop.

6. The method of claim 1 further comprising:

performing loop detection during a synchronization operation based on a synchronization relationship, to detecting the presence of a synchronization loop.

7. The method of claim 6 wherein performing loop detection during a synchronization operation further includes determining if the same copies of a synchronization root object are created in the descendants of the root object, indicating a synchronization loop.

8. The method of claim 7 further comprising terminating the synchronization operation upon detecting a synchronization loop.

9. The method of claim 7 further comprising upon detecting a synchronization loop, terminating the synchronization operation and reporting an error.

10. A synchronizing system for synchronizing content in a network, comprising:

two or more electronic devices including a content directory service (CDS), wherein each CDS comprises a hierarchical structure of containers for storing data objects; and employing a processor including a synchronization module that is configured for creating a synchronization relationship between each pair of devices among said two or more electronic devices for synchronizing objects in selected containers, wherein a combination of said synchronization relationship with one or more existing synchronization relationships, is free of a recursive synchronization loop, wherein the synchronization module further includes:

a loop detector that is configured for detecting if creating the synchronization relationship creates a loop in combination with one or more existing synchronization relationships; and a creation module that is configured such that, if a loop is not detected, then the creation module creates the synchronization relationship, otherwise, the creation module terminates the creation of the synchronization relationship.

11. The system of claim 10 wherein the synchronization module is further configured for creating a a synchronization relationship only if a combination of said synchronization relationship with one or more existing synchronization relationships is free of a recursive synchronization loop.

12. The system of claim 10 wherein the detector is further configured for determining if a destination root object or one of its lineages has the same ancestor SyncID as thin of an origin root object, indicating that the synchronization relationship will create a loop.

13. The system of claim 10 wherein the synchronization module further comprises a recursion detector that is configured for performing loop detection during a synchronization operation based on a synchronization relationship, to detect the presence of a synchronization loop.

14. The system of claim 13 wherein the recursion detector is further configured for determining if the same copies of a synchronization root object are created in the descendants of the root object, indicating a synchronization loop.

15. The system of claim 14 wherein the recursion detector is further configured for terminating the synchronization operation upon detecting a synchronization loop.

16. A synchronizing system for synchronizing content in a network, comprising:

two or more electronic devices including a content directory service (CDS) in each device, wherein each CDS comprises a hierarchical structure of containers for storing data objects; and each CDS further comprises a synchronization module that is configured for creating a synchronization relationship between each pair of devices among said two or more electronic devices for synchronizing objects in selected containers, wherein a combination of said synchronization relationship with one or more existing synchronization relationships, is free of a recursive synchronization loop, wherein each synchronization module includes:

a loop detector that is configured for detecting if creating the synchronization relationship creates a loop in combination with one or more existing synchronization relationships; and a creation module that is configured such that, if a loop is not detected, then the creation module creates the synchronization relationship, otherwise, the creation module terminates the creation of the synchronization relationship.

17. The synchronizing system of claim 16 wherein each synchronization module is further configured for creating a synchronization relationship only if a combination of said synchronization relationship, with one or more existing synchronization relationships is free of a recursive synchronization loop.

18. The synchronizing system of claim 16 wherein the detector is further configured for determining if a destination root object or one of its lineages has the same ancestor SyncID as that of an origin root object, indicating that the synchronization relationship will create a loop.

19. The synchronizing system of claim 16 wherein:
said pair of devices includes a sink device and a source device;
the loop detector of the CDS in the sink device is further configured for determining if a destination root object or one of its lineages has the same ancestor SyncID as that of an origin root object, indicating that the synchronization relationship will create a loop; and
the loop detector of the CDS in the source device is further configured for determining if a destination root object or one of its lineages has the same ancestor SyncID as that of an origin root object, indicating that the synchronization relationship will create a loop.

20. The synchronizing system of claim 16 wherein each synchronization module further comprises a recursion detector that is configured for performing loop detection during a synchronization operation based on a synchronization relationship, to detect the presence of a synchronization loop.

21. The synchronizing system of claim 20 wherein the recursion detector is further configured for determining if the same copies of a synchronization root object are created in the descendants of the root object, indicating a synchronization loop.

22. The synchronizing system of claim 21 wherein the recursion detector is further configured for terminating the synchronization operation upon detecting a synchronization loop.

23. The synchronizing system of claim 16 wherein each object has a unique object identification.

24. The synchronizing system of claim 16 wherein the electronic devices implement a type of UPnP AV protocol.

25. The synchronizing system of claim 16 wherein the network further includes a control point that is configured for initiating a synchronization process.

26. A network, comprising:
a control point;
two or more controlled devices;
a content directory service (CDS) in each device, wherein each CDS comprises a hierarchical structure of containers for storing data objects; and each CDS further comprises a synchronization module that is configured for creating a synchronization relationship between each pair of devices among said two or more devices for synchronizing objects in selected containers, wherein a combination of said synchronization relationship with one or more existing synchronization relationships, is free of a recursive synchronization loop, wherein each synchronization module includes:
a loop detector that is configured for detecting if creating a synchronization relationship creates a loop in combination with one or more existing synchronization relationships; and
a creation module that is configured such that, if a loop is not detected, then the creation module creates the synchronization relationship, otherwise, the creation module terminates the creation of the synchronization relationship.

27. The network of claim 26 wherein each synchronization module is further configured for creating a synchronization relationship only if a combination of said synchronization relationship with one or more existing synchronization relationships is free of a recursive synchronization loop.

28. The network of claim 26 wherein the detector is further configured for determining if a destination root object or one of its lineages has the same ancestor SyncID as that of an origin root object, indicating that the synchronization relationship will create a loop.

29. The network of claim 26 wherein:
said pair of devices includes a sink device and a source device;
the loop detector of the CDS in the sink device is further configured for determining if a destination root object or one of its lineages has the same ancestor SyncID as that of an origin root object, indicating that the synchronization relationship will create a loop; and
the loop detector of the CDS in the source device is further configured for determining if a destination root object or one of its lineages has the same ancestor SyncID as that of an origin root object, indicating that the synchronization relationship will create a loop.

30. The network of claim 26 wherein each synchronization module further comprises a recursion detector that is configured for performing loop detection during a synchronization operation based on a synchronization relationship, to detect the presence of a synchronization loop.

31. The network of claim 30 wherein the recursion detector is further configured for determining if the same copies of a synchronization root object are created in the descendants of the root object, indicating a synchronization loop.

32. The network of claim 31 wherein the recursion detector is further configured for terminating the synchronization operation upon detecting a synchronization loop.

33. The network of claim 26 wherein each object has a unique object identification.

34. The network of claim 26 wherein the network further includes a control point that is configured for initiating a synchronization process.

35. The network of claim 26 wherein the control point and the devices implement a UPnP AV protocol.

* * * * *